3,402,220
HOMOGENEOUS BLEND OF UNCURED BUTYL AND CURED CHLOROBUTYL RUBBERS
Clarence Robert Bierman, Barrington, and Walter Arthur Fourier, Crystal Lake, Ill., assignors to American Can Company, a corporation of New Jersey
No Drawing. Filed Dec. 27, 1965, Ser. No. 516,691
4 Claims. (Cl. 260—888)

ABSTRACT OF THE DISCLOSURE

An intimate and homogeneous mixture of uncured butyl rubber and cured chlorobutyl rubber useful in caulking and sealing compositions.

---

The instant invention relates to an intimate and homogeneous mixture of two rubbers having different hardness and solubility characteristics; and, in particular, it relates to an intimate homogeneous mixture of a relatively soft, solvent soluble rubber and a relatively hard, solvent insoluble rubber, from which mixture may be prepared a sealing compound for a container closure having outstanding resistance to flow at elevated temperatures.

It is known to the art that intimate mixtures of solvent soluble and solvent insoluble rubbers produce superior container sealing or gasketing compounds known in the packaging industry as end lining compounds. Examples of such prior art are Leydon #2,593,681 and Fourier #3,145,189. Although the process for producing such rubber mixtures disclosed by Leydon is highly useful and has achieved a substantial amount of commercial success, the art has sought simpler and less expensive ways in which to obtain these rubber mixtures while at the same time improving the quality of the end lining compounds produced therefrom. Fourier, supra, was a major step towards this end, The instant invention is a further improvement over the inventions of Leydon and Fourier.

Two of the most important properties of end lining compounds are their inertness or solubility resistance to fats and/or vegetable oils present in a wide variety of canned products; and their resistance to excessive softening or flowability when subjected to elevated temperatures. The desirability of the first property is obvious; and the mixed rubber compositions disclosed by Leydon provide this property due primarily to the solvent-insoluble component of these compositions. The second property is needed because in a great many instances, the end lining compound is subjected to elevated temperatures before, during and/or after it is enclosed, under compression, within the double seam of the can. If the compound softens excessively under the influence of this elevated temperature, the compressive force of double seaming will cause at least portions of the lining compound to flow out of the double seam, known in the art as squeezing, making the can unsightly and establishing potential leak paths through the seam.

It is therefore an object of the instant invention to provide a novel rubber composition for imparting outstanding resistance to squeezing to an end lining compound.

Another object is to provide a mixed rubber composition which forms the base stock for an end lining compound which not only is resistant to fats and vegetable oils but also resists squeezing at temperatures to which sheet metal cans are subjected.

A further object is to provide a simple, efficient and novel means for producing a mixed rubber composition of the present invention.

Numerous other objects and advantages of the invention will be apparent as it is better undertsood from the following description which is of a preferred embodiment thereof.

The above objects are accomplished by providing a first, soft elastomeric copolymer of isobutylene and a diolefin and intimately mixing this first copolymer with a soft elastomeric, second chlorinated copolymer of isobutylene and a diolefin, in the presence of a curing agent for the second copolymer only, and at a temperature below which curing of the chlorinated copolymer takes place. Because of their soft condition, each of the first and second copolymers are readily blended with the expenditure of a minimum amount of time and effort. When blending or mixing of the two copolymers to a homogeneous state is accomplished, the temperature of the mixture is elevated to cure, in situ, the chlorinated copolymer only, to a tough, hardened, cohesive, relatively insoluble state. To produce a stable, i.e., nonsettling, solution-dispersion of this cured mixture, it is necessary merely to stir the cured mixture into a solvent for the uncured first copolymer. Such a solution-dispersion, when having incorporated therein other ingredients usually used for making end lining compounds, may be readily applied to a container end closure; and, upon evaporation of the solvent therefrom, the dried composition produces a highly effective fat and vegetable oil resistant and nonsqueezing end lining compound.

The first and second copolymers mentioned above are known in the art and are basically copolymers formed by copolymerizing from 97.5 to 99.4 mol percent of isobutylene with 2.5 to 0.6 mol percent of a diolefin, most usually isoprene. The first copolymer, known commercially as butyl rubber, has about 0.6 to 2.5 mol percent unsaturation due to the combined isoprene. The second copolymer, usually referred to as chlorobutyl rubber, contains between 1.0 and 1.5% by weight of combined chlorine and preferably from 1.1% to 1.3% combined chlorine. A base stock from which an end lining compound may be prepared, contains by weight from 1.5 to 5 parts of the butyl rubber per part of the chlorobutyl rubber, and preferably about 2 to 4 parts of the butyl rubber per part of chlorobutyl rubber. This blend is then cured as will be described more fully hereinafter.

In the preparation of an end lining compound, additional butyl rubber is combined, usually in crumb form, with the cured base stock to give a mixed rubber having 80 to 95% by weight of butyl rubber. All of the butyl rubber could be combined with the chlorobutyl rubber in the initial blending; however, because the butyl rubber is readily dissolved during formation of the solution-dispersion, adding it during the initial blending merely serves to increase this blending time and the power consumption therefor. Further, the reduction of the Mooney viscosity of the butyl rubber occurring during the blending operation, while tolerable, is somewhat undesirable; and adding a substantial amount of unmasticated butyl rubber offsets this Mooney viscosity reduction. Other ingredients such as fillers, plasticizers, resins, pigments, etc. may be added to the cured base mixture depending upon the use to which the end lining compound is to be put. For example, an end lining compound in fluid form ready for application to an end closure may contain Buca clay as a filler, carbon black or $TiO_2$ as a pigment, and a rosin derivative such as Staybelite resin to promote adhesion.

As indicated previously, the essential step of the method of the instant invention resides in intimately mixing, in the presence of a curing agent for the chlorobutyl rubber only, the butyl rubber and chlorobutyl rubber while they are both in a soft state so that the mixing or blending to homogeneity can be accomplished simply and easily. However, since the rubbers at this stage of the process are elastomeric solids, a heavy-duty mixer such as a Banbury or Baker-Perkins is preferred for this mixing operation.

Further, since frictional heat is generated during this mixing operation the mixer should be jacketed to permit circulation of a cooling liquid, such cool water to maintain the temperature of the mass below the curing temperature of the chlorobutyl rubber. For example, when blending the two rubbers in the presence of zinc oxide as a curing agent, the temperature in the mixer during the blending operation should be maintained below 290° F. and preferably below 260° F. Some temperature elevation above room temperature is desirable since it has the effect of plasticizing the two rubbers enabling easier blending.

After complete blending of the butyl and chlorobutyl rubbers and the curing or vulcanizing agent for the latter, the temperature in the heavy-duty mixer is raised to effect the cure of the chlorobutyl rubber.

Butyl rubber, under the influence of heat and a curing agent, will cure to a hardened insoluble state as will the chlorobutyl rubber. However, for the instant invention, it is essential that the butyl rubber cure very little if at all; and for this reason, the curing agent used must be selective of the chlorobutyl rubber only. The curing agent found most suitable for this selective curing of the chlorobutyl rubber only is zinc oxide in an amount of, by weight, at least 3 parts and preferably about 5 parts per 100 parts of chlorobutyl rubber.

The curing reaction of the chlorobutyl rubber by the zinc oxide takes place in an acid medium. Acidic materials which are not detrimental to either the reaction mass, the end lining compound or the equipment used, such as stearic acid or zinc chloride, are suitable to provide the acidic environment necessary for the curing reaction. Stearic acid is preferred as the acidic material since it not only provides the acid environment but it also acts as an activator for the curing reaction.

Due to the tendency of some of the chlorine to split-off from the polymeric chain of the chlorobutyl rubber at elevated temperatures, it is preferable to cure the chlorobutyl rubber in the presence of a chlorine acceptor such as MgO.

When using zinc oxide as the curing agent, the temperature should be raised to above 300° F. and preferably to about 330° F. Temperatures above 400° F. are undesirable because of the possibility of curing an appreciable amount of the butyl rubber, which cure, undesirably, reduces its solubility. With the jacketed, heavy-duty mixer this temperature increase is readily accomplished by discontinuing the circulation of cooling liquid necessary for the initial mixing and passing steam through the jacket while continuing the mixing. To obtain and maintain a substantially uniform temperature throughout the mass of blended rubbers, mixing of the two rubbers during the curing cycle is continued during the reaction. The reaction time is a function of the rate of heat transfer into the reaction mass which rate will depend upon a number of independent variables such as the type of mixing apparatus used, the size of the mass and the temperature gradient between the heating medium and the mass. Continued mixing of the mass during this curing cycle or reaction is not, however, absolutely essential inasmuch as the initially mixed mass can be transferred into an oven and cured while the mass is in a static state. However, heat transfer is much more rapid if the mass is mixed during the heating cycle thereby substantially reducing the time necessary to effect the cure compared to the time required for a static state cure.

Completion of the curing reaction is indicated when the reaction mass has achieved a Mooney viscosity of 100 to 110. Depending upon the independent variables noted above, this time will generally vary from 15 to 60 minutes; and for a dynamic curing cycle, i.e. mixing or agitation of the mass during curing, the curing time will usually fall in the range from 15 to 25 minutes.

The following example is by way of explanation only and is not to be considered a limitation on the scope of the invention. The amounts given in this example are by weight.

In a jacketed Banbury mixer 15 parts of chlorobutyl rubber having a Mooney viscosity of 51–60 and containing 1.1 to 1.3% combined chlorine and 35 parts of butyl rubber having 0.6 to 2.5% unsaturation and a Mooney viscosity of 41–49 were mixed. During this mixing operation cold water was circulated through the jacket to maintain the temperature of the stock during mixing below 260° F. During this mixing there were added 24.8 parts of Buca clay, 20.5 parts of $TiO_2$, 0.75 part of zinc oxide, 0.4 part MgO and 0.8 part of stearic acid. After the addition of all of the ingredients the mixing was continued for about 10 minutes to insure complete and homogeneous blending of all of the ingredients. While continuing the mixing the water cooling was replaced by steam to bring the stock to a temperature of about 330° F. Approximately 6 minutes was required to achieve substantially uniform stock temperature. Thereafter mixing was continued for an additional 20 minutes during which time individual particles of chlorobutyl rubber, uniformly and intimately dispersed throughout the mass, were cured to a hardened solvent insoluble state. Mooney viscosity determinations of the above composition before curing were 60–65; whereas the Mooney viscosity of the cured composition had increased to 100–110, which indicated that the curing reaction was completed and the chlorobutyl phase of the mass had been cured.

To prepare an end lining compound, 6.3 parts zinc resinate is dissolved in hexane. Then 32.2 parts Buca clay, 21.2 parts of butyl rubber and 40.3 parts of the cured mixed rubber composition are added to the solution. This solution-dispersion was readily obtained using a Hi-Shear dissolving mixer such as Cowles Dissolver to produce a fluid composition having 36% solids and a viscosity of 2500–3000 cps.; and dispersion of the cured, tough insoluble chlorobutyl rubber was readily accomplished because of its fine particle size and uniform dispersion thereof in the mixed rubber composition. This fluid composition is readily deposited on a periphery of a sheet metal end closure using standard end lining equipment and thereafter dried to an essentially solvent free state.

Tests of cans utilizing the instant end lining compound showed this compound to be markedly superior in squeezing resistance to all known prior art fat and oil resistant end lining compounds.

It is thought that the invention and many of its attendant advantages will be understood from the foregoing description and it will be apparent that various changes may be made in the matter of the ingredients, their identity, and their proportions and in the steps of the process and their order of accomplishment without departing from the spirit and scope of the invention or sacrificing all of its material advantages, the form hereinbefore described being merely a preferred embodiment thereof.

We claim:

1. A method of making an intimate and homogeneous mixture containing a major portion of a soft, elastomeric, first uncured copolymer consisting essentially of 90 to 99.5 parts of combined isobutylene, 0.5 to 10 parts of combined diolefin, and a minor amount of a relatively hard, elastomeric, second cured copolymer consisting essentially of 90 to 99.5 parts of combined isobutylene, 0.5 to 10 parts of combined diolefin and 1.0 to 1.5% by weight of combined chlorine, said uncured copolymer being soluble in hexane and said cured copolymer being essentially insoluble in hexane, the steps comprising:

providing said second copolymer in its uncured soft state;

mixing said first copolymer and said uncured second copolymer and a curing agent capable of selectively curing said second copolymer at a temperature below 290° F. to form an intimate homogeneous mixture of said two copolymers;

heating said mixture to a temperature above 300° F.; and masticating said mixture at said elevated temperature to effect, in less than an hour, curing in situ of said uncured second copolymer to a relatively hard, elastomeric state wherein it is insoluble in hexane while maintaining the solubility of said first copolymer in hexane.

2. The method set forth in claim 1 wherein said mixture is masticated for 20 minutes at a temperature of 330° F. to cure said second copolymer in situ.

3. The method set forth in claim 1 wherein said curing agent is zinc oxide.

4. A composition produced according to the method set forth in claim 1.

References Cited

UNITED STATES PATENTS

| | | | |
|---|---|---|---|
| 2,593,681 | 4/1952 | Leydon | 260—5 |
| 2,903,437 | 9/1959 | Van Epp | 260—888 |
| 2,948,700 | 8/1960 | Eby et al. | 260—888 |
| 3,057,390 | 10/1962 | Pattison et al. | 260—888 |
| 3,076,777 | 2/1963 | Zeolla et al. | 260—888 |
| 3,145,189 | 8/1964 | Fourier | 260—5 |

MURRAY TILLMAN, *Primary Examiner.*

M. J. TULLY, *Assistant Examiner.*